(12) United States Patent
Phillips et al.

(10) Patent No.: US 12,505,417 B2
(45) Date of Patent: Dec. 23, 2025

(54) ALERTING USERS OF A PHYSICAL PICKUP POINT

(71) Applicant: Capital One Services, LLC, McLean, VA (US)

(72) Inventors: Jeremy J. Phillips, Brooklyn, NY (US); Trevor Connolly, Brooklyn, NY (US); Danielle Simpson, Manassas, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/528,331

(22) Filed: Nov. 17, 2021

(65) Prior Publication Data

US 2023/0153773 A1    May 18, 2023

(51) Int. Cl.
*G06Q 20/10* (2012.01)
*G06Q 20/16* (2012.01)
*G06Q 20/32* (2012.01)

(52) U.S. Cl.
CPC ......... *G06Q 20/1085* (2013.01); *G06Q 20/16* (2013.01); *G06Q 20/3224* (2013.01)

(58) Field of Classification Search
CPC . G06Q 20/1085; G06Q 20/16; G06Q 20/3224
USPC ........................................................ 705/43
See application file for complete search history.

(56) References Cited

U.S. PATENT DOCUMENTS

| | | | |
|---|---|---|---|
| 9,922,370 B2 | 3/2018 | Kobres et al. | |
| 10,373,148 B1 | 8/2019 | Dixon et al. | |
| 10,885,751 B2 | 1/2021 | Hazard et al. | |
| 2006/0206709 A1* | 9/2006 | Labrou | G06Q 20/18 713/167 |

(Continued)

FOREIGN PATENT DOCUMENTS

WO    WO-2016014125 A1 *  1/2016  .......... G06Q 20/385

OTHER PUBLICATIONS

Park, F.S. et al., Leveraging Cellular Infrastructure to Improve Fraud Prevention (2009) 2009 Annual Computer Security Applications Conference, IEEE, DOI 10.1109/ACSAC.2009.40, pp. 350-359. (Year: 2009).*

(Continued)

*Primary Examiner* — Ambreen A. Alladin
(74) *Attorney, Agent, or Firm* — Sterne, Kessler, Goldstein & Fox P.L.L.C.

(57) ABSTRACT

The method, system, and non-transitory computer-readable medium embodiments described herein are directed to alerting a user of a physical pickup point. In various embodiments, a server receives a request to be completed by one or more Automated Teller Machines (ATMs) located at a first location. The server may be in communication with the ATMs at the first location and a sensor device at the first location. The server receives an alert generated by the sensor device at the first location that the user device is proximate the first location. Next, the server identifies one or more ATMs in a state to complete the request based on a parameter associated with the request. Next, the server transmits (Continued)

an identifier of the at least one ATM of the one or more ATMs that will be used to complete the request to the user device and instructs the at least one ATM to complete the request.

20 Claims, 6 Drawing Sheets

(56) References Cited

U.S. PATENT DOCUMENTS

| | | | |
|---|---|---|---|
| 2013/0124411 A1* | 5/2013 | Kobres | G06Q 40/02 235/379 |
| 2016/0012411 A1* | 1/2016 | Kursun | G07F 19/205 705/42 |
| 2016/0019537 A1 | 1/2016 | Raja et al. | |
| 2019/0295055 A1 | 9/2019 | Kuchenski et al. | |
| 2020/0005262 A1 | 1/2020 | Arora et al. | |
| 2020/0356979 A1 | 11/2020 | Dadhaniya et al. | |
| 2021/0042743 A1 | 2/2021 | Green et al. | |

OTHER PUBLICATIONS

International Search Report and Written Opinion directed to related patent application No. PCT/US2022/079937, mailed Dec. 16, 2022, 15 pages.
European Search Report directed to related EP application No. 22896673.5, dated Sep. 1, 2025, 9 pages.

* cited by examiner

ALERTING USERS OF A PHYSICAL PICKUP POINT

BACKGROUND

Many banks presently offer a mobile banking application experience that allows account holders to conduct various transactions on their mobile devices, such as a smartphone. For example, an account holder may use the mobile banking application to transfer funds from a savings account to a checking account, or pay bills from their funds, all from the comfort of their mobile device from anywhere in the world.

Despite this flexibility, some transactions must still be conducted through an ATM (or through in-person banking with a human teller). In particular, cash withdrawals require physical access to the money, so interacting with a teller (human or ATM) is typically part of the process. When interacting directly with a teller, additional information about the customer must be provided in order to complete the transaction securely. This information is already known to the mobile banking application, allowing mobile transactions to be carried out more quickly.

Furthermore, entities have increasingly adopted using websites or mobile applications to pre-stage transactions. Pre-staging a transaction involves a user initiating the steps of the transaction (e.g., selecting an item for pick up) and completing the transaction at the entity's location (e.g., picking up the item). The user may need to come to the entity's location to complete their transaction. However, this may be confusing for the user as the entity may fail to direct the user to the proper location to complete the transaction. Furthermore, the entity may not know that the user has arrived to complete the transaction. This may lead to the user wasting time looking for a designated pickup point and may cause errors, as the user may pick up an item not designated for them. As a result, conventional systems and processes can be inefficient and error-prone.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, provide for alerting a user of a physical pickup point.

As described above, entities, such as financial institutions, government agencies, educational institutions, corporations may allow users to use mobile applications or websites to pre-stage transactions. For example, a user may complete the initial steps of a transaction using a mobile application or website and complete the transaction at the entity's location. As a non-limiting example, a user may use a banking application to initiate an Automated Machine Teller (ATM) transaction and complete the transaction at the ATM. The transaction may include withdrawals, deposits, purchases of travelers' checks, etc. Furthermore, users may have preferences regarding their transactions that every ATM cannot fulfill. However, conventional systems and processes cannot detect when the user is at the entity's location and direct the user to the physical pickup point to complete the transaction. Furthermore, conventional systems cannot direct a user to a physical pickup location that allows the user to complete the transaction based on the user's preferences. This can lead to inefficiencies and can be error-prone.

Embodiments described herein solve these problems by detecting a user is at the entity's location to complete the pre-staged transaction and alerting the user of the physical pickup point. In various embodiments, a server receives a request to be completed by one or more Automated Teller Machines (ATMs) located at a first location. The server may be in communication with the ATMs at the first location and a sensor device at the first location. The server receives an alert generated by the sensor device at the first location that the user device is proximate the first location. Next, the server identifies one or more ATMs in a state to complete the request based on a parameter associated with the request. Next, the server transmits an identifier of the at least one ATM of the one or more ATMs that will be used to complete the request to the user device and instructs the at least one ATM to complete the request.

The various embodiments described herein allow for detecting the user at the entity's location (e.g., first location) based on the sensing device detecting the user device and directing the user to the appropriate pickup location (e.g., the at least one ATM) to complete a pre-staged transaction. This eliminates the confusion and inefficiency of searching for the physical pickup location. As a result, the various embodiments described herein provide a seamless process for a user to pre-stage a transaction at one location and complete the transaction at the entities' location.

Figure 1:
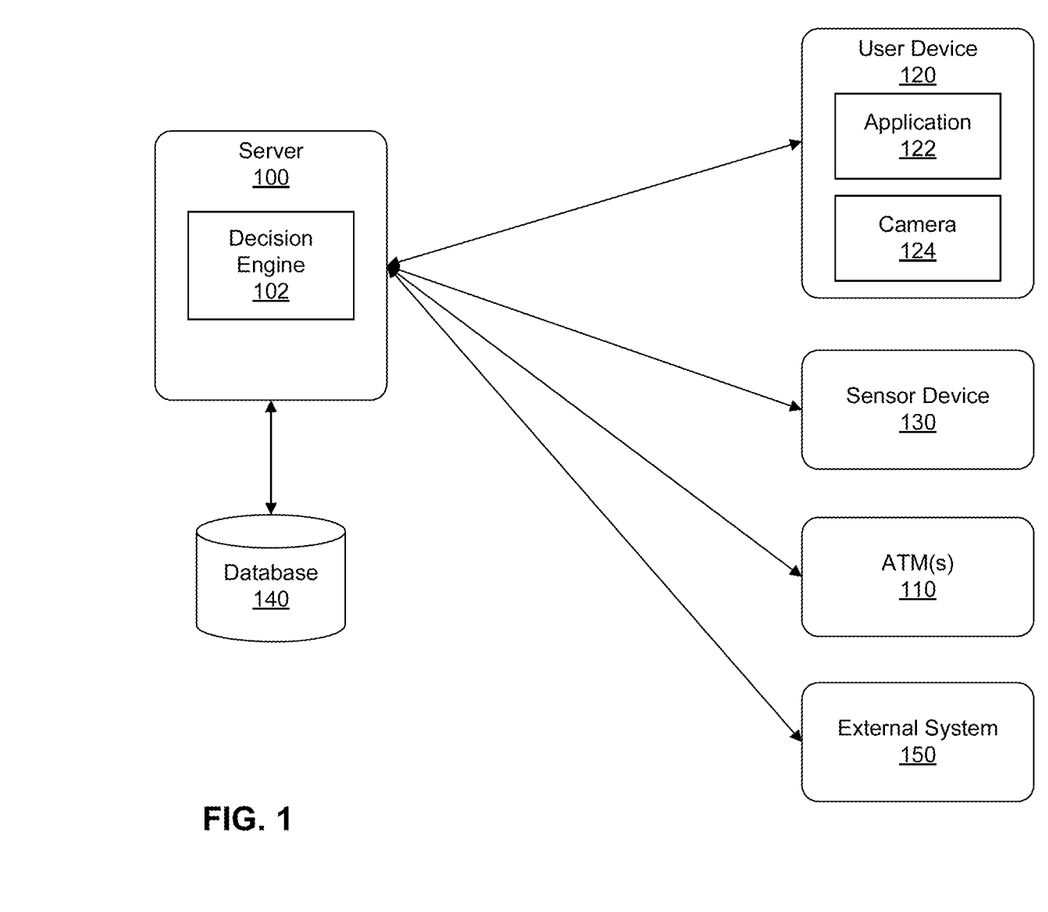
FIG. 1 is a block diagram of a system for alerting users of a physical pickup location, according to various embodiments.

FIG. 1 is a block diagram of a system for alerting users of a physical pickup location, according to various embodiments. In an embodiment, the system can include a server 100, automated teller machine(s) (ATM(s)) 110, user device 120, sensor device 130, and database 140. Server 100 may communicate with ATM 110, user device 120, sensor device 130, and database 140.

The devices of the system for alerting users of a physical pickup location can be connected through wired connections, wireless connections, or a combination of wired and wireless connections. As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In various embodiments, ATM 110 may be configured to facilitate financial transactions by a user. Some examples of financial transactions that may be performed using the ATM 110 can include currency withdrawals (e.g., cash withdrawals, cryptocurrency withdrawals, etc.), currency deposits (e.g., cash deposits, cryptocurrency deposits, etc.), transfer of funds (e.g., transferring from a first financial account to a second account or between financial organizations or institutions, etc.), obtaining financial account information, checking a financial account balance, printing checks, printing account statements, printing money orders, etc. In addition, ATM 110 may be located at a location, such as a bank, grocery store, university campus, office building, etc.

User device 120 may be operated by the user. User device 120 may execute application 122. As a non-limiting example, application 122 may be a banking application. Application 122 may allow a user to perform electronic banking transactions with their banking account, such as view balance, view account activity, dispute charges, transfer funds, schedule automatic payments, etc.

Application 122 may also allow the user to pre-stage transactions at ATM 110. Pre-staging a transaction may involve initiating the transaction. For example, the transaction may be withdrawing a predetermined amount of cash or depositing cash or checks using ATM 110. A user may interact with application 122 to transmit a request for pre-staging a transaction at ATM 110. The pre-staged transaction may be completed when the user withdraws the predetermined amount of cash from ATM 110. Pre-staging and completing a transaction will be described in further detail with respect to FIG. 2.

User device 120 may also include camera 124. Camera 124 may be an image capturing device. For example, camera 124 may be configured to capture still or moving images. Moreover, camera 124 may be configured to scan machine-readable elements, such as QR codes or two-dimensional barcodes. For example, application 122 may implement a barcode reader using camera 124.

User device 120 may also act as a beacon. For example, user device 120 may include a wireless transmitter that is configured to emit signals. The signals may be Bluetooth® signals. Furthermore, the signals may be encoded with information about the user device 120. For example, the signal may be encoded with an identifier, security information (e.g., a security certificate), GPS location, etc.

Sensor device 130 may be a beacon sensing device. In particular, sensor device 130 may implement Bluetooth® or Near Field Communication (NFC) technology to detect beacon signals emitted by devices, such as user device 120. Sensor device 130 may be located at the same location as ATM 110. In various embodiments, sensor device 130 may be integrated in ATM 110. In this respect, sensor device 130 may implement ATM NFC. ATM NFC allows user device 120 to communicate with ATM 110. As a result, the user may execute ATM transactions at ATM 110 using user device 120.

Database 140 may be one or more data storage devices. Database 140 may be configured to store various types of data associated with ATM 110 and user accounts. For example, the data associated with ATM 110 may include the information about ATMs associated with a particular financial institution, capabilities of different ATMs, location of the ATMs, (near) real-time ATM balance updates, transactions completed by ATMs, denominations available at ATMs, etc. User account information may include a user name, date of birth, address, social security number, account balances, transactions, preferences, etc.

External system 150 may be configured to interface with a user's account at a financial institution. External system 150 may access the user's account information via a secure network. External system 150 may be configured to permit or deny ATM transactions based on the user account information, user transaction history, type of transaction, etc. In various embodiments, external system 150 may be integrated with server 100. Alternatively, external system 150 may be isolated and self-contained.

Server 100 may execute decision engine 102. Decision engine 102 may facilitate the completion of the pre-staged transaction at ATM 110. Decision engine 102 may communicate with ATM 110, user device 120, sensor device 130, database 140, and external system 150.

Figure 2:
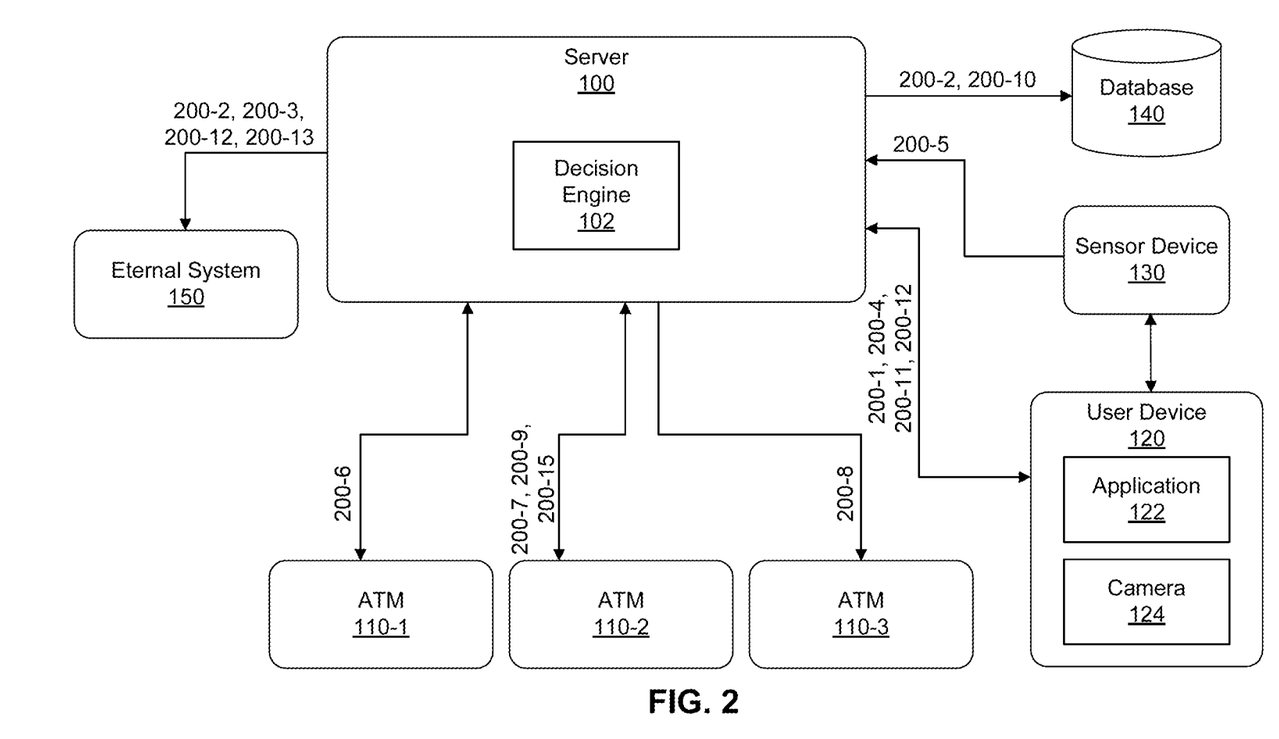
FIG. 2 is a block diagram illustrating the data flow of the system for alerting users of a physical pickup location, according to various embodiments.

FIG. 2 is a block diagram illustrating the data flow of the system for alerting users of a physical pickup location, according to various embodiments.

In various embodiments, ATM 110-1, ATM 110-2, and ATM 110-3 may be similar to ATM 110, as shown in FIG. 1. ATM 110-1, ATM 110-2, and ATM 110-3 may be located at a first location. Furthermore, ATM 110-1, ATM 110-2, and ATM 110-3 may be affiliated with a financial institution (e.g., a bank). Information about ATM 110-1, ATM 110-2, and ATM 110-3, such as balances, operational status, denominations available, etc., may be stored in database 140.

The user of user device 120 may interact with user device 120 to launch application 122. As indicated above, application 122 may be a banking application. In response to launching application 122, the user may log in to application 122 using a single sign-on (SSO). SSO may require a username and password or other authentication details. In some embodiments, user device 120 may store the user's username and password and may automatically input the username and password in response to the user providing biometric information, such as a facial scan or fingerprint scan.

The user may select the option to pre-stage the transaction from application 122. As a non-limiting example, the transaction may be a withdrawal of cash. In response to the user selecting the option to pre-stage the transaction, application 122 may attempt to authenticate the user a second time using multi-factor authentication (MFA). MFA may include a one-time passcode (OTP), biometric information (figure print scan, facial scan, iris scan, etc.), etc.

In response to authenticating the user using MFA, application 122 may unlock particular features. The features may include pre-staging transactions, wiring money over a threshold amount, withdrawing more than a threshold amount of cash, etc. The user may interact with application 122 to generate a request 200-1 to pre-stage a withdrawal of cash. The user may specify one or more parameters related to the withdrawal of cash. The parameters may include an amount to be withdrawn and preferences with respect to the withdrawal in request 200-1.

The preferences may include preferred denominations, preferred location, and preferred date and time to retrieve the cash. By providing a preferred location and preferred date and time to retrieve the cash, the user can schedule a cash withdrawal for a vacation. The preferred location may be a zip code, address, or global positioning service (GPS) coordinates. In the event the user does not specify a preferred location, application 122 may determine the location of user device 112. In this regard, application 122 may access user device 120's GPS location data.

Application 122 may identify locations including ATMs that can complete the pre-staged transaction (e.g., withdrawal of cash) within a predetermined radius of the preferred location or user device 120's GPS location. For example, application 122 may query database 140 to identify locations, including ATMs that can complete the pre-staged transaction (e.g., withdrawal of cash), within a predetermined radius of preferred location or user device 120's GPS location data. In addition, application 122 may identify the locations with including ATMs based on the information about the pre-staged transaction and user preferences. That is, application 122 may only identify locations of ATMs that are able to complete the transaction based on the amount to be withdrawn and preferred denominations. In various embodiments, application 122 may prioritize the information about the pre-staged transaction and the user preferences. For example, application 122 may determine that it is more important to find an ATM that is able to complete the transaction based on the amount to be withdrawn compared to finding an ATM that carries the preferred denominations.

The user may specify the predetermined radius. For example, the predetermined radius may be 5 miles, 10 miles, 20 miles, etc. Application 122 may render the locations on a map on user device 120. The user may select a location rendered on the map. As a non-limiting example, the user may select the first location where ATM 110-1, ATM 110-2, and ATM 110-3 are located. The first location may be included in request 200-1.

The user may complete pre-staging of the transaction by transmitting request 200-1 to server 100. Server 100 may receive request 200-1, and decision engine 102 may unpack request 200-1. Request 200-1 may include user information (e.g., username, full legal name, identifier, etc.), user device 120 information (e.g., device identifier), type of pre-staged transaction, and parameters of the pre-staged transaction. The parameters may include withdrawal amount, preferred date and time of withdrawal, preferred denominations, and selected location. In various embodiments, request 200-1 may also include user device 120's GPS location data. As a result, decision engine 102 may determine that the user and user device 120 are at the second location based on user device 120's GPS location data.

In various embodiments, if the event request 200-1 does not include preferred denominations or user preferences, decision engine 102 may determine the user preferences. For example, decision engine 102 may query database 140 to retrieve a user transaction history using user information received in request 200-1. Decision engine 102 may determine that the user prefers particular denominations when withdrawing cash based on the user transaction history. Moreover, decision engine 102 may determine that the user purchases stamps at the ATM. As a result, decision engine 102 may store the user's preferred denominations and preference of purchasing stamps in database 140.

Decision engine 102 may transmit request 200-2 to external system 150 to approve the pre-staged transaction. Request 200-2 may include the information unpacked from request 200-1. External system 150 may use the user's transaction history (e.g., withdrawals, spending habits, deposits), user information (e.g., account balance), and other information (e.g., withdrawal amount) about the pre-staged transaction to approve or deny the pre-staged transaction. For example, external system 150 may compare the amount to be withdrawn to the user's transaction history and account balance. External system 150 may determine that the amount to be withdrawn is within an average amount that the user withdraws and is within the amount the user is allowed to withdraw based on the financial institution's rules (e.g., daily withdrawal limits) and the user's account balance. As a result, external system 150 may approve the transaction. Conversely, external system 150 may determine that the amount to be withdrawn is outside the average amount that the user withdraws and/or is exceeds the amount that the user is allowed to withdraw based on the rules of the financial institution and the user's account balance. As a result, external system 150 may deny the transaction.

External system 150 may transmit response 200-3 to decision engine 102. Response 200-3 may include approval or denial of the pre-staged transaction. Decision engine 102 may transmit response 200-4 to application 122. Response 200-4 may be an approval or denial of the pre-staged transaction. Response 200-4 may include a message indicating that the pre-staged transaction was approved or denied. Application 122 may display the message on user device 120. If the pre-staged transaction was approved, application 122 may instruct the user to navigate to the first location to complete the pre-staged transaction. Application 122 may also instruct the user to launch application 122 once the user arrives at the first location.

If the pre-staged transaction was approved, decision engine 102 may transmit request 200-2 to database 140 to store the information unpacked from request 200-1 and any identified user preferences. In the event that request 200-1 did not include a preferred date and time of withdrawal, decision engine 102 may determine an approximate date and time the user will arrive at the first location based on a distance between the first location and the second location. Request 200-2 may also include the approximate date and time that the user will arrive at the first location to complete the pre-staged transaction.

In various embodiments, each time user device 120 launches application 122, after pre-staging the transaction, application 122 may transmit user device 120's updated GPS location data to server 100. This way, decision engine 102 may approximate a date and time that the user will arrive at the first location to complete the pre-staged transaction based on each time server 100 receives user device 120's updated GPS location data. Decision engine 102 may update the approximate date and time that the user will arrive at the first location each time server 100 receives user device 120's updated GPS location data and store the updated date and time in database 140.

Decision engine 102 may instruct sensor device 130 located at the first location to detect wireless signals emitted by user device 120 in response to user device 120 being within a predetermined distance of the first location. In particular, decision engine 102 may instruct sensor device 130 to detect user device 120 information (e.g., device identifier, name, etc.) encoded in wireless signals emitted by user device 120. Alternatively, decision engine 102 may instruct sensor device 130 to detect a signal including user device 120 information within the predetermined distance of the first location at a particular date and time based on the preferred date and time of withdrawal or approximate date and time that the user will arrive at the first location to complete the pre-staged transaction.

The user may navigate to the first location with user device 120. As indicated above, user device 120 may act as a beacon. In particular, user device 120 may emit wireless signals using a wireless transmitter. In various embodiments, in response to user device 120 launching application 122, application 122 may instruct user device 120's wireless transmitter to emit wireless signals. The signals may be encoded with user device 120 information (e.g., device identifier, name, etc.), GPS location, etc.

Sensor device 130 may detect the wireless signals emitted by user device 120 in response to user device 120 being within the predetermined distance of the first location. In other words, sensor device 130 may determine user device 120 is proximate to the first location. Sensor device 130 may unpack the wireless signal. Sensor device 130 may transmit alert 200-5 to server 100. Alert 200-5 may signify that the user device is proximate to the first location based on user device 120 being within the predetermined distance of the first location. Alert 200-5 may include user device 120 information (e.g., identifier, name, etc.), GPS location, etc.

In response to receiving alert 200-5, decision engine 102 may transmit request 200-6 to ATM 110-1, request 200-7 to ATM 110-2, and request 200-8 to ATM 110-2 to determine which ATM is in a state to complete the pre-staged transaction. An ATM may be in a state to complete the pre-staged transaction if the ATM is functional and not used by another user. An ATM in a state to complete the pre-staged transaction may transmit a response to server 100 in response to the received request indicating the ATM's state. For example, ATM 110-2 may transmit response 200-9 to decision engine 102 indicating that ATM 110-2 is in a state to complete the pre-staged transaction.

Decision engine 102 may also transmit a query 200-10 to database 140 to determine whether ATM 110-2 is able to complete the pre-staged transaction based on the user's preferences (included in request 200-1 or determined based on the user's transaction history). For example, decision engine 102 may confirm whether ATM 110-2 has enough balance and/or carries the preferred denominations to complete the pre-staged transaction. In the event that ATM 110-2 cannot complete the pre-staged transaction based on the user's preferences, decision engine 102 may not direct the user to complete the pre-staged transaction at ATM 110-2. In addition, decision engine 102 may periodically poll ATM 110-1 or ATM 110-3 to determine which ATM is available to complete the pre-staged transaction.

In response to confirming that ATM 110-2 is able to complete the pre-staged transaction based on the user's preferences, decision engine 102 may transmit response 200-11 to user device 120. Response 200-11 may include a message directing the user to complete the pre-staged transaction at ATM 110-2. The message may include an identifier of ATM 110-2 and instructions to completing the pre-staged transaction. The message may be rendered in application 122. This is illustrated in FIG. 3.

Figure 3:
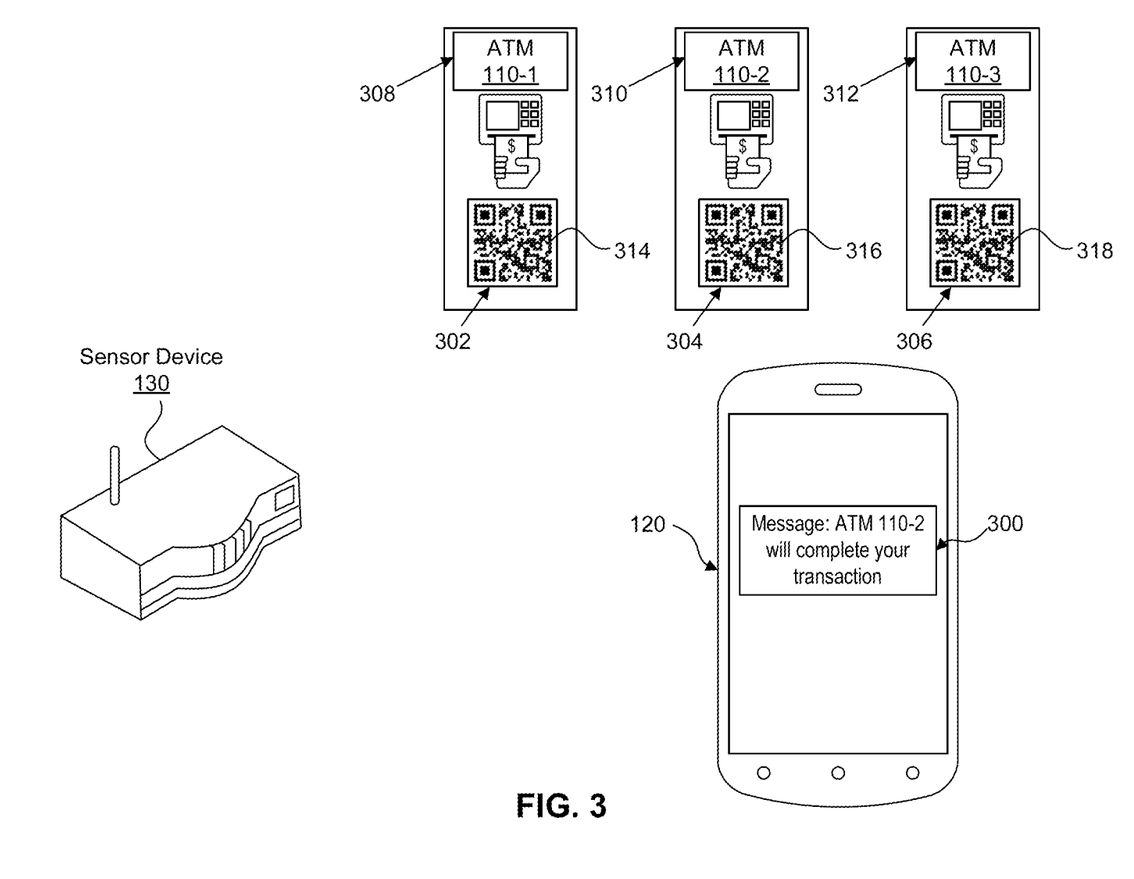
FIG. 3 is a block diagram illustrating ATMs, a sensor device, and a user device, according to some embodiments.

FIG. 3 is a block diagram illustrating ATMs, a sensor device, and a user device, according to some embodiments. ATM 110-1 may include display 302, ATM 110-2 may include display 304, and ATM 110-3 may include display 306. Markings of each ATM's identifier may be may be located with respect to each respective ATM. For example, marking 308 may be located with respect to ATM 110-1, marking 310 may be located with respect to ATM 110-2, and marking 312 may be located with respect to ATM 110-3. Furthermore, ATMs 110-1-110-3 may render Quick Response (QR) codes on their respective displays. ATM 110-1 may render QR code 314 on display 302, ATM 110-2 may render QR code 316 on display 304, and ATM 110-3 may render QR code 318 on display 306. Each QR code may be embedded with a link.

Barcodes, such as QR codes formed according to a specific standard, may be readable by any reader that conforms to the barcode standards. For example, a barcode reader implemented by application 122 would obtain raw data present in any QR code. Accordingly, a skilled artisan would understand that the barcode reader implemented by application 122 is any form of device capable of reading a QR code displayed on ATMs 110-1-110-3.

Message 300 may be rendered on user device 120's display. Message 300 may include an identifier of ATM 110-2 (e.g., "ATM 110-2"). Message 300 may also indicate that ATM 110-2 will complete the pre-staged transaction. Message 300 may prompt the user to go to ATM 110-2 to complete the transaction. The user may find ATM 110-2 based on marking 310.

The user may interact with application 122 to launch camera 124 to scan and read QR code 316. Application 122 may implement a barcode reader via camera 124. The user may point camera 124 at QR code 316. Camera 124 may continuously capture image frames of QR code 316 and transmit the image frames to application 122. Application 122 may actuate the link embedded in QR code 316.

Returning to FIG. 2, application 122 may transmit request 200-12 to server 100 in response to actuating the link embedded in QR code 316. The link may include ATM 110-2's identifier. Request 200-12 may include ATM 110-2's identifier. Decision engine 102 may confirm that user device 120 is attempting to complete the pre-staged transaction based on receiving request 200-12.

In various embodiments, decision engine 102 may transmit request 200-13 to external system 150 to confirm that the user is still approved to complete the pre-staged transaction. External system 150 may use the information about the pre-staged transaction (e.g., amount to be withdrawn) and the user's transaction history to approve or deny the completion of the pre-staged transaction. External system 150 may transmit response 200-14 to decision engine 102. Response 200-13 may indicate whether the user is approved to complete the pre-staged transaction. Decision engine 102 may transmit request 200-15 to ATM 110-2 in response to determining that the user is approved to complete the pre-staged transaction. Request 200-15 may include instructions to complete the pre-staged transaction. In particular, request 200-15 may include instructions for ATM 110-2 to dispense cash based on the withdrawal amount specified in request 200-1 and the user preferences (specified in request 200-1 or determined based on the user's transaction history).

While FIGS. 1-3 illustrate the system for alerting users of a physical pickup location in the banking industry; the system may also be implemented in other types of industries that facilitate pre-staging transactions. For example, the system may be implemented in grocery pickup at grocery stores where pre-ordered groceries may be dispensed to users via a dispensing device. The system may also be implemented in the retail industry, where users may pick up their purchased items in a pickup location at a retail store.

Figure 4:
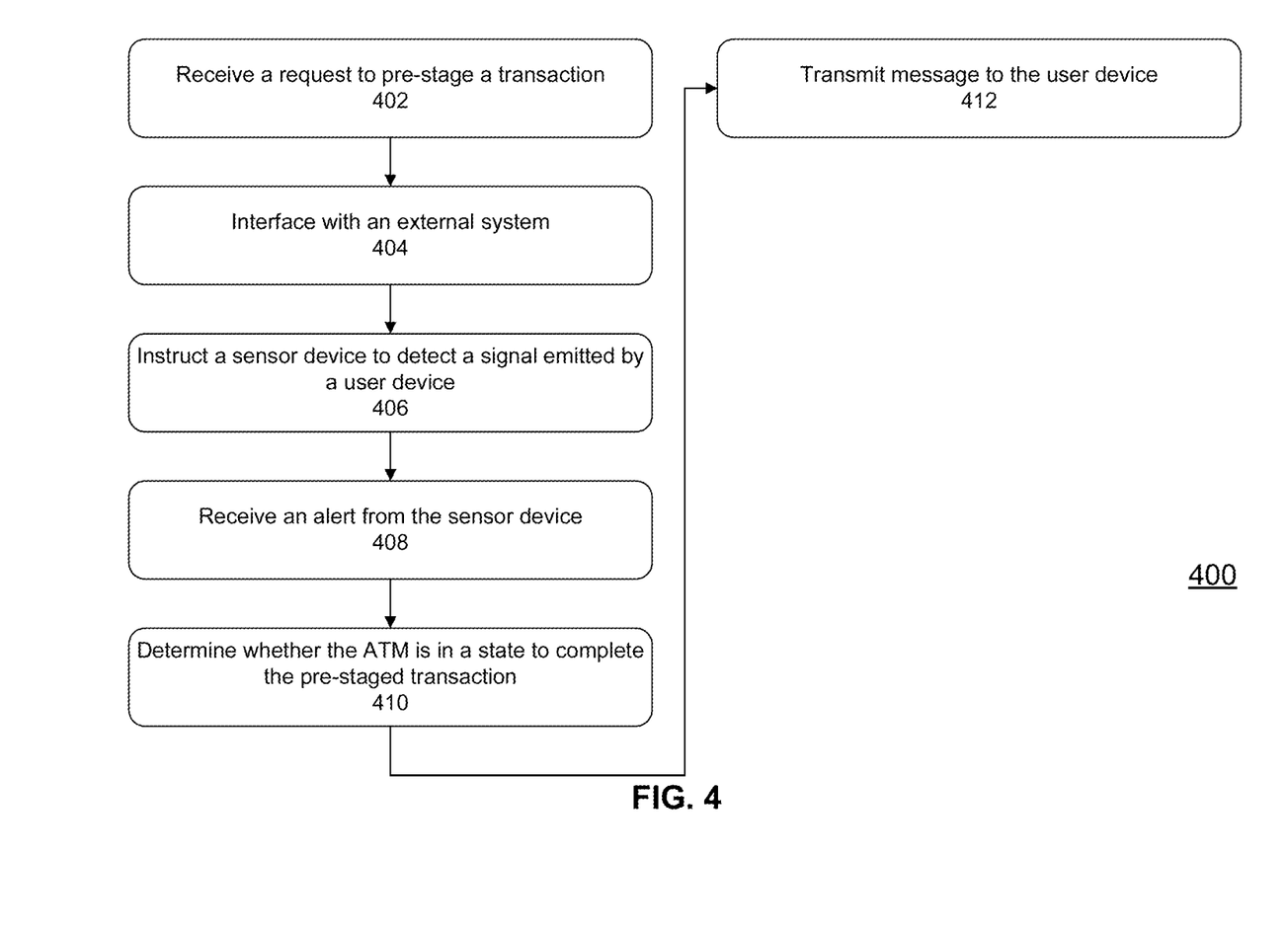
FIG. 4 is a flowchart illustrating a process for pre-staging a transaction, according to various embodiments.

FIG. 4 is a flowchart illustrating a process 400 for pre-staging a transaction, according to various embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to those example embodiments.

In operation 402, server 100 receives a request to pre-stage a transaction. User device 120 may transmit the request using application 122. The transaction may be an ATM transaction, such as withdrawal or deposit. As such, the pre-staged transaction may be completed at ATM 110. The request may include user information, user device 120 information, information about the pre-staged transaction, preferences regarding the pre-staged transaction, and location of ATM 110. For example, ATM 110 may be located in the first location. Furthermore, user device 120 information may include a device identifier.

In operation 404, server 100 interfaces with external system 150 to approve or deny the pre-staged transaction. For example, the transaction may be a withdrawal of cash from the user's bank account. External system 150 may use the user information, user transaction history, and information about the pre-staged transaction to approve or deny the pre-staged transaction. Server 100 stores the user information, user device 120 information, information about the pre-staged transaction, and preferences regarding the pre-staged transaction in database 140, in response to external system 150 approving the pre-staged transaction.

In operation 406, server 100 instructs sensor device 130 to detect signals emitted by user device 120, including user device 120 information (e.g., device identifier). Sensor device 130 may be disposed at the first location. Furthermore, sensor device 130 may be configured to detect wireless signals emitted by user device 120's wireless transmitter in response to user device 120 being within a predetermined distance of the first location. In various embodiments, server 100 may instruct sensor device 130 to detect the signals emitted by user device 120 at a particular date and time based on a determination that user device 120 will arrive at the first location on the particular date and time to complete the pre-staged transaction.

In operation 408, server 100 receives an alert from sensor device 130 indicating that the user is proximate to the first location. Sensor device 130 may detect a wireless signal including user device 120 information (e.g., device identifier) in response to user device 120 being within the predetermined distance of the first location. Sensor device 130 may generate the alert, including user device 120 information, and transmit the alert to server 100. The alert may signify that the user is at the first location or is proximate to the first location.

In operation 410, server 100 determines whether ATM 110 is in a state to complete the pre-staged transaction. Server 100 may transmit a request to ATM 110 to poll the ATM 110. ATM 110 may transmit a response to server 110 if ATM 110 is in a state to complete the pre-staged transaction. ATM 110 may be in a state to complete the pre-staged transaction if ATM 110 is functional and not used by another user.

In operation 412, server 100 transmits a message to user device 120 indicating that ATM 110 is in a state to complete the pre-staged transaction. The message may include an identifier of ATM 110 and may prompt the user to go to ATM 110 to complete the pre-staged transaction (e.g., withdrawal of cash). User device 120 may render the message in application 122.

Figure 5:
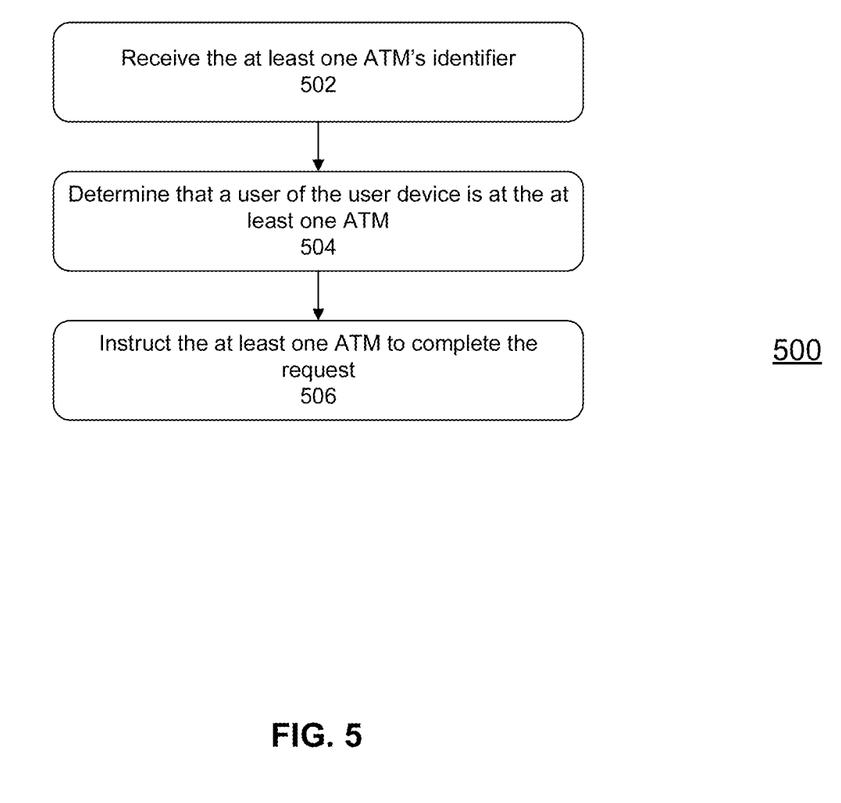
FIG. 5 is a flowchart illustrating a process for completing a pre-staged transaction, according to various embodiments.

FIG. 5 is a flowchart illustrating a process 500 for completing a pre-staged transaction, according to various embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to those example embodiments.

In operation 502, server 100 receives an identifier of ATM 110 from user device 120. As indicated with respect to method 400, server 100 may transmit a message to user device 120 to prompt the user to use ATM 110 to complete the pre-staged transaction. ATM 110 may render a QR code on its display. The QR code may be embedded with a link. The user may interact with application 122 to make camera 124 operational. The user may point camera 124 at the QR code, and application 122 may actuate the link embedded in the QR code. Actuating the link may cause application 122 to transmit the identifier of ATM 110 to server 100.

In operation 504, server 100 determines that the user is attempting to complete the pre-staged transaction based on receiving the identifier from user device 120. Server 100 may retrieve the information about the pre-staged transaction from database 140. In various embodiments, server 100 may interface with external system 150 to approve or deny the completion of the pre-staged transaction.

In operation 506, server 100 instructs ATM 110 to execute the pre-staged transaction based on the information about the pre-staged transaction. The information about the pre-staged transaction may include the amount of cash to be withdrawn and user preferences. In addition, the user preferences may include the type of preferred denominations.

Figure 6:
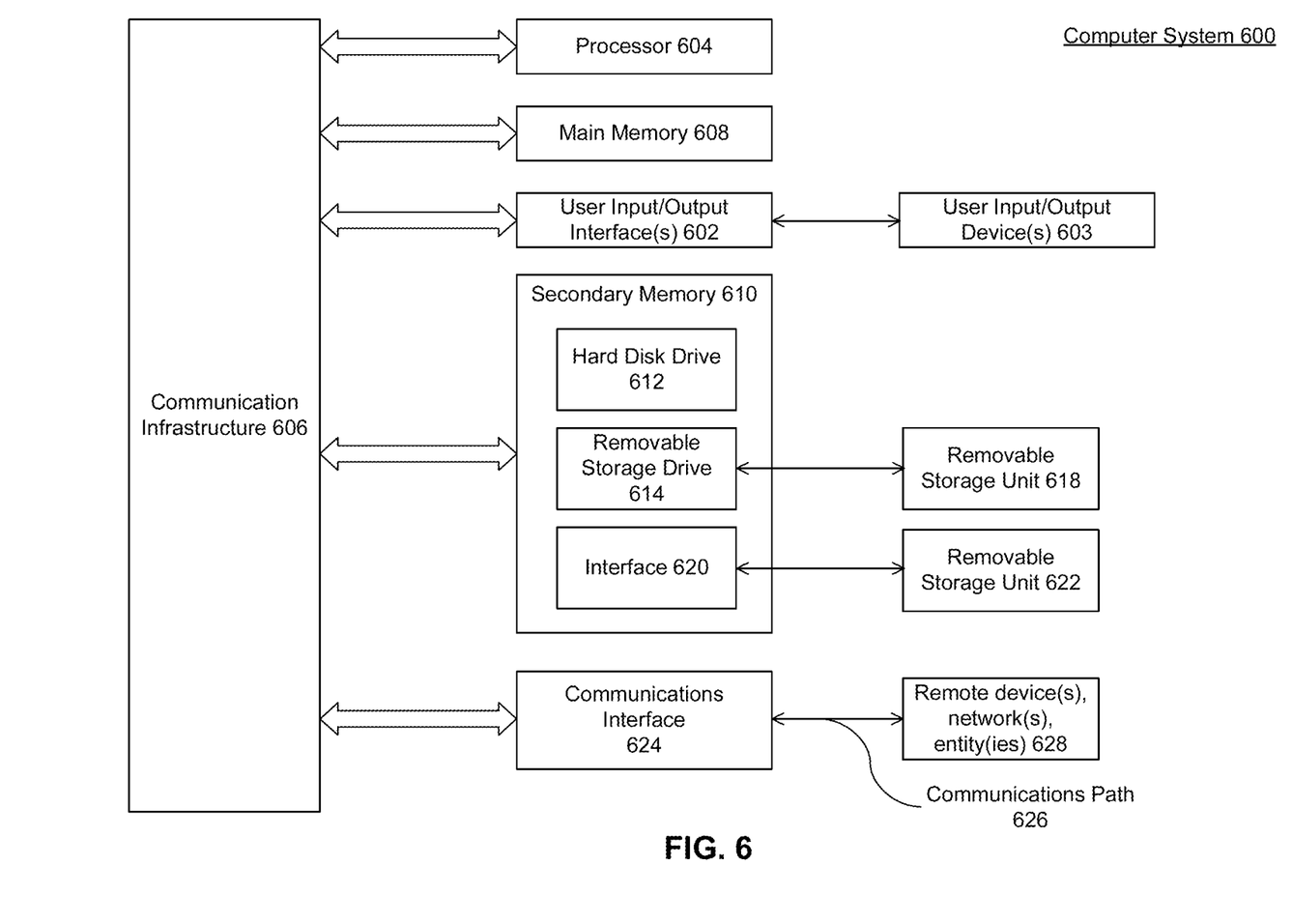
FIG. 6 is an example computer system useful for implementing various embodiments.

Various embodiments can be implemented, for example, using one or more computer systems, such as computer system 600 shown in FIG. 6. Computer system 600 can be used, for example, to implement method 400 of FIG. 4 and method 600 of FIG. 6. Furthermore, computer system 600 can be at least part of server 100, ATM 110, user device 120, sensor device 130, database 140, and external system 150 as shown in FIG. 1. For example, computer system 600 route communication to various applications. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer database. Removable storage drive 614 reads from and/or writes to removable storage unit 618 in a well-known manner.

According to an exemplary embodiment, secondary memory 610 can include other means, instrumentalities, or other approaches for allowing computer programs and/or other instructions and/or data to be accessed by computer system 600. Such means, instrumentalities, or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANS, the Internet, etc. Control logic and/or data can be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, various embodiments can be described using the expression "coupled" and "connected" along with their derivatives. These terms are not necessarily intended as synonyms for each other. For example, various embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

launching, by a processor, a mobile banking application based on user interaction with a user device;

logging, by the processor, a user in to the mobile banking application based on authenticating the user responsive to launching the mobile banking application;

receiving, by the processor, from the user device, a request to pre-stage a transaction;

authenticating, by the processor, the user using multi-factor authentication (MFA) responsive to receiving the request to pre-stage the transaction, wherein the request includes a transaction amount and location data of the user device, the location data being global positioning service (GPS) coordinates associated with a first location, the first location being determined by the mobile banking application on the user device based on authenticating the user using the MFA;

determining, by the processor, a second location based on the location data of the user device, wherein the second location includes a plurality of Automated Teller Machines (ATMs);

detecting, by the processor, using a sensor device at the second location, signals transmitted by the user device within a predetermined distance of the second location, the user device being instructed by the mobile banking application to act as a beacon responsive to the user launching the mobile banking application, the signals being encoded with information associated with the user device;

in response to the sensor device detecting signals, receiving, by the processor, an alert generated by the sensor device at the second location signifying that the user device is proximate to the second location;

in response to the receiving the alert, transmitting, by the processor, a request to the plurality of ATMs to determine states of the plurality of ATMs;

receiving, by the processor, a response from an ATM from the plurality of ATMs, the response comprising the state of the ATM that the ATM is functional and not used by another user;

selecting, by the processor, the ATM from the plurality of ATMs partly based on the transaction amount and the state of the ATM;

transmitting, by the processor, to the user device, an identifier of the ATM, the identifier being associated with the ATM and corresponding to a marking of the ATM to differentiate the ATM from the remainder of the plurality of ATMs; and instructing, by the processor, the ATM to execute the transaction.

2. The method of claim 1, further comprising:
in response to the receiving the request to pre-stage the transaction, determining, by the processor, an approximate date and time when the user device will be located at the second location to complete the request, based on the location data of the user device at a time of the request, wherein the approximate date and time are determined based on a distance between the first location of the user device and the second location.

3. The method of claim 2, wherein the first location is updated based on receiving updated GPS coordinates from the user device responsive to the user device launching the mobile banking application.

4. The method of claim 1, further comprising:
receiving, by the processor, the identifier of the ATM from the user device in a request to complete the pre-staged transaction;

determining, by the processor, that a user of the user device is at the ATM based on the receiving the identifier; and instructing, by the processor, the ATM to execute the transaction in response to the determining that the user of the user device is at the ATM.

5. The method of claim 4, wherein the receiving of the identifier from the user device is in response to the user device actuating a link associated with the ATM.

6. The method of claim 1, wherein:
the request further includes desired denominations associated with the transaction amount, and
the determining the second location is further based on the desired denominations.

7. The method of claim 6, wherein the selecting the ATM from the plurality of ATMs comprises:
determining, by the processor, that the ATM is configured to dispense the desired denominations and the transaction amount.

8. The method of claim 1, further comprising:
transmitting, by the processor, the second location to the user device after the receiving of the request.

9. A computing system comprising:
at least one memory; and
at least one processor coupled to the at least one memory, the at least one processor configured to perform operations comprising:
launching a mobile banking application based on user interaction with a user device;
logging a user in to the mobile banking application based on authenticating the user responsive to launching the mobile banking application;
receiving, from the user device, a request to pre-stage a transaction;
authenticating the user using multi-factor authentication (MFA) responsive to receiving the request to pre-stage the transaction, wherein the request includes a transaction amount and location data of the user device, the location data being global positioning service (GPS) coordinates associated with a first location, the first location being determined by the mobile banking application on the user device based on authenticating the user using the MFA;
determining a second location based on the location data of the user device, wherein the second location includes a plurality of Automated Teller Machines (ATMs);
detecting, using a sensor device at the second location, to signals transmitted by the user device within a predetermined distance of the second location, the user device being instructed by the mobile banking application to act as a beacon responsive to the user launching the mobile banking application, the signals being encoded with information associated with the user device;
in response to the sensor device detecting signals, receiving an alert generated by the sensor device at the second location signifying that the user device is proximate to the second location;
in response to the receiving the alert, transmitting a request to the plurality of ATMs to determine states of the plurality of ATMs;
receiving a response from an ATM from the plurality of ATMs, the response comprising the state of the ATM that the ATM is functional and not used by another user;
selecting the ATM from the plurality of ATMs partly based on the transaction amount and the state of the ATM;
transmitting to the user device, an identifier of the ATM, the identifier being associated with the ATM and corresponding to a marking of the ATM to differentiate the ATM from the remainder of the plurality of ATMs; and
instructing the ATM to execute the transaction.

10. The system of claim 9, further comprising:
in response to the receiving the request to pre-stage the transaction, determining an approximate date and time when the user device will be located at the second location to complete the request, based on the location data of the user device at a time of the request,
wherein the approximate date and time are determined based on a distance between the first location of the user device and the second location.

11. The system of claim 10, wherein the at least one processor is further configured to update the first location based on receiving updated GPS coordinates from the user device responsive to the user device launching the mobile banking application.

12. The system of claim 9, wherein the operations further comprise:
receiving the identifier of the ATM from the user device in a request to complete the pre-staged transaction;
determining that a user of the user device is at the ATM based on the receiving the identifier; and
instructing the ATM to execute the pre-staged transaction in response to the determining that the user of the user device is at the ATM,
wherein the receiving of the identifier from the user device is in response to the user device actuating a link associated with the ATM.

13. The system of claim 9, wherein:
the request further includes desired denominations associated with the transaction amount, and
the determining the second location is further based on the desired denominations.

14. The system of claim 13, wherein the selecting the ATM from the plurality of ATMs comprises: determining that the ATM is configured to dispense the desired denominations and total amount.

15. The system of claim 9, wherein the operations further comprise: transmitting the second location to the user device after the receiving of the request.

16. A non-transitory computer-readable medium having instructions stored thereon that, when executed by at least one computing device, cause the at least one computing device to perform operations, the operations comprising:
launching a mobile banking application based on user interaction with a user device;
logging a user in to the mobile banking application based on authenticating the user responsive to launching the mobile banking application;
receiving, from the user device, a request to pre-stage a transaction;
authenticating the user using multi-factor authentication (MFA) responsive to receiving the request to pre-stage the transaction, wherein the request includes a transaction amount and location data of the user device, the location data being global positioning service (GPS) coordinates associated with a first location, the first location being determined by the mobile banking application on the user device based on authenticating the user using the MFA;
determining a second location based on the location data of the user device, wherein the second location includes a plurality of Automated Teller Machines (ATMs);
detecting, using a sensor device at the second location, signals transmitted by the user device within a predetermined distance of the second location, the user device being instructed by the mobile banking application to act as a beacon responsive to the user launching the mobile banking application, the signals being encoded with information associated with the user device;
in response to the sensor device detecting signals, receiving an alert generated by a sensor device at the second location signifying that the user device is proximate to the second location;
in response to the receiving the alert, transmitting a request to the plurality of ATMs to determine states of the plurality of ATMs;
receiving a response from an ATM from the plurality of ATMs, the response comprising the state of the ATM that the ATM is functional and not used by another user;
selecting the ATM from the plurality of ATMs partly based on the transaction amount and the state of the ATM;
transmitting to the user device, an identifier of the ATM, the identifier being associated with the ATM and corresponding to a marking of the ATM to differentiate the ATM from the remainder of the plurality of ATMs; and
instructing the ATM to execute the transaction.

17. The non-transitory computer readable medium of claim 16, further comprising:
in response to the receiving the request to pre-stage the transaction, determining an approximate date and time when the user device will be located at the second location to complete the request, based on the location data of the user device at a time of the request,
wherein the approximate date and time are determined based on a distance between a first location of the user device and the second location.

18. The non-transitory computer-readable medium of claim 17, wherein the first location is updated based on receiving updated GPS coordinates from the user device responsive to the user device launching the mobile banking application.

19. The non-transitory computer-readable medium of claim 16, wherein:
the request further includes desired denominations associated with the transaction amount, and
the determining the second location is further based on the desired denominations.

20. The non-transitory computer-readable medium of claim 19, wherein the selecting the ATM from the plurality of ATMs comprises:
determining that the ATM is configured to dispense the desired denominations and the transaction amount.

* * * * *